United States Patent
Nirei

(10) Patent No.: US 7,551,528 B2
(45) Date of Patent: Jun. 23, 2009

(54) METHOD AND APPARATUS FOR TRACKING SERVO CONTROL OF AN OPTICAL DISC PLAYBACK APPARATUS

(75) Inventor: Shinichi Nirei, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 702 days.

(21) Appl. No.: 11/041,190

(22) Filed: Jan. 21, 2005

(65) Prior Publication Data

US 2005/0169146 A1 Aug. 4, 2005

(30) Foreign Application Priority Data

Jan. 30, 2004 (JP) .............................. 2004-023123

(51) Int. Cl.
*G11B 7/00* (2006.01)
(52) U.S. Cl. ............... 369/44.32; 369/53.35; 369/53.16
(58) Field of Classification Search ........................ None
See application file for complete search history.

(56) References Cited

U.S. PATENT DOCUMENTS 6,172,953 B1 * 1/2001 Kamiyama ............... 369/53.15
6,341,113 B1 1/2002 Kamiyama
6,510,112 B1 1/2003 Sakamoto et al.
6,947,359 B2 * 9/2005 Yokoyama et al. ....... 369/44.29

FOREIGN PATENT DOCUMENTS

| JP | 01-162281   | 6/1989 |
| JP | 2000-90467  | 3/2000 |
| JP | 2000-163767 | 6/2000 |
| JP | 2001-243641 | 9/2001 |

* cited by examiner

*Primary Examiner*—Joseph Feild
*Assistant Examiner*—Joseph Haley
(74) *Attorney, Agent, or Firm*—Brinks Hofer Gilson & Lione

(57) ABSTRACT

An optical disc playback apparatus includes an optical pickup, an RF amplifier that generates a tracking error (TE) signal based on an electrical signal from the optical pickup, a defect detector that detects a defect on the optical disc and that outputs a DFCT signal indicating the detected defect, a switch that outputs a hold signal when a defect is detected based on the DFCT signal, a driver that controls the optical pickup based on the output signal of the switch, a corrector that extracts an oscillation component of the optical pickup from the TE signal in response to the DFCT signal when a defect is detected and that outputs a correction signal indicating the oscillation component, and an adder that adds the correction signal from the corrector to the hold signal.

10 Claims, 10 Drawing Sheets

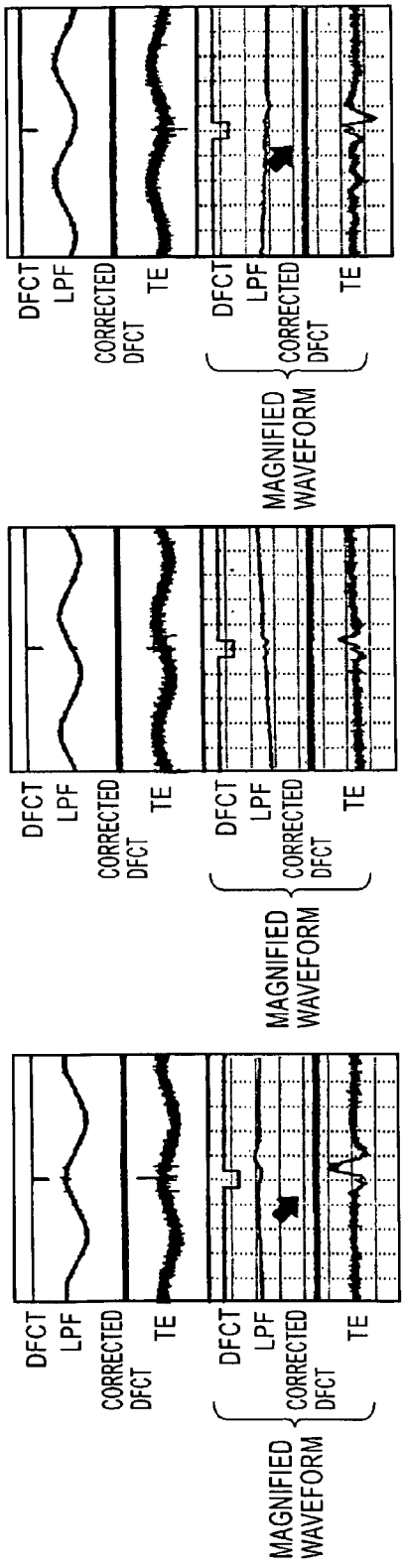

PRIOR ART

METHOD AND APPARATUS FOR TRACKING SERVO CONTROL OF AN OPTICAL DISC PLAYBACK APPARATUS

BACKGROUND OF THE INVENTION

1. Field of the Invention

The present invention relates to an optical disc playback apparatus for optically reading and/or playing back data recorded in a disc-shaped recording medium (hereinafter referred to as an optical disc), such as a CD (Compact Disc) or a DVD (Digital Versatile Disc). More specifically, the present invention relates to tracking servo control of an optical disc playback apparatus.

2. Description of the Related Art

FIG. 7 is a block diagram of an optical disc playback apparatus. The optical disc playback apparatus shown in FIG. 7 includes an optical pickup 10, an RF amplifier 12, a signal processor 14, a digital-to-analog converter (DAC) 16, a low-pass filter (LPF) 18, a gain adjuster 20, a servo equalizer 22, a hold equalizer 24, a switch 26, a driver 30, and a defect detection circuit 28. The optical pickup 10 irradiates an optical disc with light, and converts the reflected light into an electrical signal. The RF amplifier 12 generates a readout signal (RF signal) and a tracking error (TE) signal based on the signal from the optical pickup 10. The signal processor 14 performs processing, such as decoding, on the RF signal from the RF amplifier 12. The DAC 16 converts the signal from the signal processor 14 into an analog signal. The LPF 18 removes the high-frequency component of the signal from the DAC 16, and outputs the resulting audio signal. The gain adjuster 20 adjusts the gain of the TE signal from the RF amplifier 12. The servo equalizer 22 corrects for the frequency characteristics of the gain-adjusted signal. The hold equalizer 24 holds the signal from the servo equalizer 22. The switch 26 selects from the output signals of the servo equalizer 22 and the hold equalizer 24, and supplies the selected output signal as a tracking driving (TD) signal to the driver 30. The driver 30 controls a driving motor etc., of the optical pickup 10 based on the TD signal from the switch 26. The defect detection circuit 28 detects any defects on the optical disc, including scratches, stains, and black spots, and outputs a DFCT signal indicating a detected defect. According to the DFCT signal output from the defect detection circuit 28, the switch 26 supplies the hold signal of the hold equalizer 24 to the driver 30.

FIG. 8 is a diagram showing a three-beam signal detection system of the optical pickup 10. A main beam M at the center is used for reading signals and for focusing the beam onto a track. Two sub-beams S1 and S2 are deviated by about a quarter of the track pitch in the track line direction. A differential circuit 32 determines the difference between the electrical signals obtained from the sub-beams S1 and S2, and the RF amplifier 12 generates the TE signal based on the difference.

As shown in FIG. 9A, an RF signal (a) drops at the position of a defect on the optical disc. The defect detection circuit 28 detects this drop, and generates a DFCT signal (b) having a pulse width corresponding to the period of time during which the RF signal falls. When a defect of the optical disc is detected, a TE signal (d) suffers large amplitude turbulence, and becomes undesirable. Therefore, if a defect is detected, the switch 26 outputs, as a TD signal (c), the hold signal held before the defect is detected to the driver 30. This hold signal is substantially constant, and provides stable tracking servo for the driver 30. Thus, the main beam M of the optical pickup can properly follow a target track.

For example, Japanese Unexamined Patent Application Publication No. 2000-90467 discloses a servo device having a tracking hold function for any defects on an optical disc.

However, an optical disc playback apparatus of the related art has the following problems. When the optical disc apparatus is in an environment susceptible to shock or vibration, e.g., in a vehicle, an external force caused by shock or vibration affects an optical pickup. In such an environment, when a defective disc is played back, lens oscillation occurs due to the acceleration component caused by vibration although the level of the TD signal is held.

FIGS. 10A to 10C are signal waveforms in playing back a defective disc in a two-dimensional vibration environment. In FIGS. 10A to 10C, "TE signal (without vibration)" indicates a TE signal in a case where the optical disc playback apparatus is used in a non-vibration environment, and "TE signal (with vibration)" indicates a TE signal in a case where the optical disc playback apparatus is used in a vibration environment. The TE signal on the plus side indicates that the lens of the pickup is shifted to the outer circumference, and the TE signal on the minus side indicates that the lens is shifted to the inner circumference. In a vibration environment, the TE signal exhibits a waveform in which oscillation levels overlap. In passing through defects, the farther from the target track the lens position is, the larger turbulence the TE signal suffers at the on-track time after the level holding for the defects.

The TE signal is at the most negative/minus point (i.e., the lens is at the innermost position) at defect detecting time T1, and is at the most positive/plus point (i.e., the lens is at the outermost position) at defect detecting time T3. At defect detecting time T2, the lens is substantially in the center position. Thus, the TE signal suffers large amplitude turbulence at the defect detecting times T1 and T3.

In larger amplitude levels, as shown in FIG. 10B, if time T4 at which the lens position is far from the target track coincides with the time at which a defect is passed through, the TE signal has an excessive large amplitude level, and the servo becomes out of control.

FIG. 10C shows waveforms of the TE signal when an optical disc having no defects is played back in a vibration environment. Although servo is out of control at time T5 at which the lens position is far from the target track, the servo function is still achievable even in a relatively large vibration environment, compared to playback of a defective optical disc. Therefore, in playing back a defective optical disc, a problem occurs in that servo is susceptible to vibration.

SUMMARY OF THE INVENTION

In order to overcome the problems of the related art, it is an object of the present invention to provide an optical disc playback apparatus in which a defective optical disc can be played back in a vibrating environment.

It is another object of the present invention to provide an optical disc playback apparatus in which servo is less susceptible to vibration.

According to one aspect, an optical disc playback apparatus includes an optical pickup that irradiates a recording surface of an optical disc with light and outputs an electrical signal based on the light reflected from the recording surface, an error signal generating circuit that generates an error signal of the optical pickup with respect to the recording surface based on the electrical signal, and a defect detecting circuit that detects a defect on the recording surface of the optical disc based on the electrical signal and that outputs a defect detection signal indicating the detected defect. A switch circuit that outputs, based on the defect detection signal, a servo driving signal based on the error signal when no defect is detected and a hold signal when a defect is detected is also provided. The hold signal holds the servo driving signal before the defect is detected. According to this aspect, a driving control circuit that controls the optical pickup based on the signal output from the switch circuit, a correcting circuit that extracts an oscillation component of the optical pickup from the error signal when a defect is detected based on the defect detection signal and outputs a correction signal indicating the oscillation component, and an adding circuit that adds the correction signal output from the correction circuit to the hold signal output from the switch circuit is included in the apparatus.

The correcting circuit preferably includes an extracting circuit that extracts a low-frequency signal indicating the oscillation component of the optical pickup from the error signal, a pulse generating circuit that generates a pulse signal having a pulse width in response to the defect detection signal, and an output circuit that outputs the low-frequency signal as the correction signal in accordance with the pulse width of the pulse signal.

The correcting circuit preferably includes a pulse width control circuit that varies the pulse width of the pulse signal output from the pulse generating circuit according to the size of the defect.

In another aspect, an optical disc playback method includes the acts of irradiating a recording surface of an optical disc with light to output an electrical signal based on the light reflected by the recording surface, generating an error signal of the optical pickup with respect to the recording surface based on the electrical signal, outputting a defect detection signal indicating a defect that is detected on the recording surface of the optical disc based on the electrical signal, outputting, based on the defect detection signal, a servo driving signal based on the error signal when no defect is detected and a hold signal when a defect is detected, the hold signal holding the servo driving signal before the defect is detected, outputting a correction signal indicating an oscillation component of the optical pickup, the oscillation component being extracted from the error signal when a defect is detected based on the defect detection signal, and adding the correction signal to the hold signal.

According to a preferred embodiment of an optical disc playback apparatus, when a defect is detected on an optical disc, a correction signal indicating an oscillation component of an optical pickup is added to a hold signal applied to a driving control circuit to control driving of the optical pickup. Thus, even if a defective optical disc is played back in a vibration environment, high-response servo control of the optical pickup can be achieved for appropriate playback. Therefore, the vibration resistance during playback can be improved compared to an optical disc playback apparatus of the prior art.

BRIEF DESCRIPTION OF THE DRAWINGS

FIGS. 3A, 3B, and 3C are waveforms of a TE signal without a correction circuit;

FIGS. 3D, 3E, and 3F are waveforms of a TE signal with a correction circuit;

DESCRIPTION OF THE PREFERRED EMBODIMENTS

An optical disc playback apparatus may be used in on-vehicle audio systems and navigation systems. A recording medium to be played back by the optical disc playback apparatus may be an optical disc, such as a CD-ROM disc, a CD-R disc, a CD-RW disc, or a DVD. The optical disc may store audio data and video data. The stored data may be compressed using a certain format. Preferred embodiments of the present invention will now be described in detail with reference to the drawings.

Figure 1:
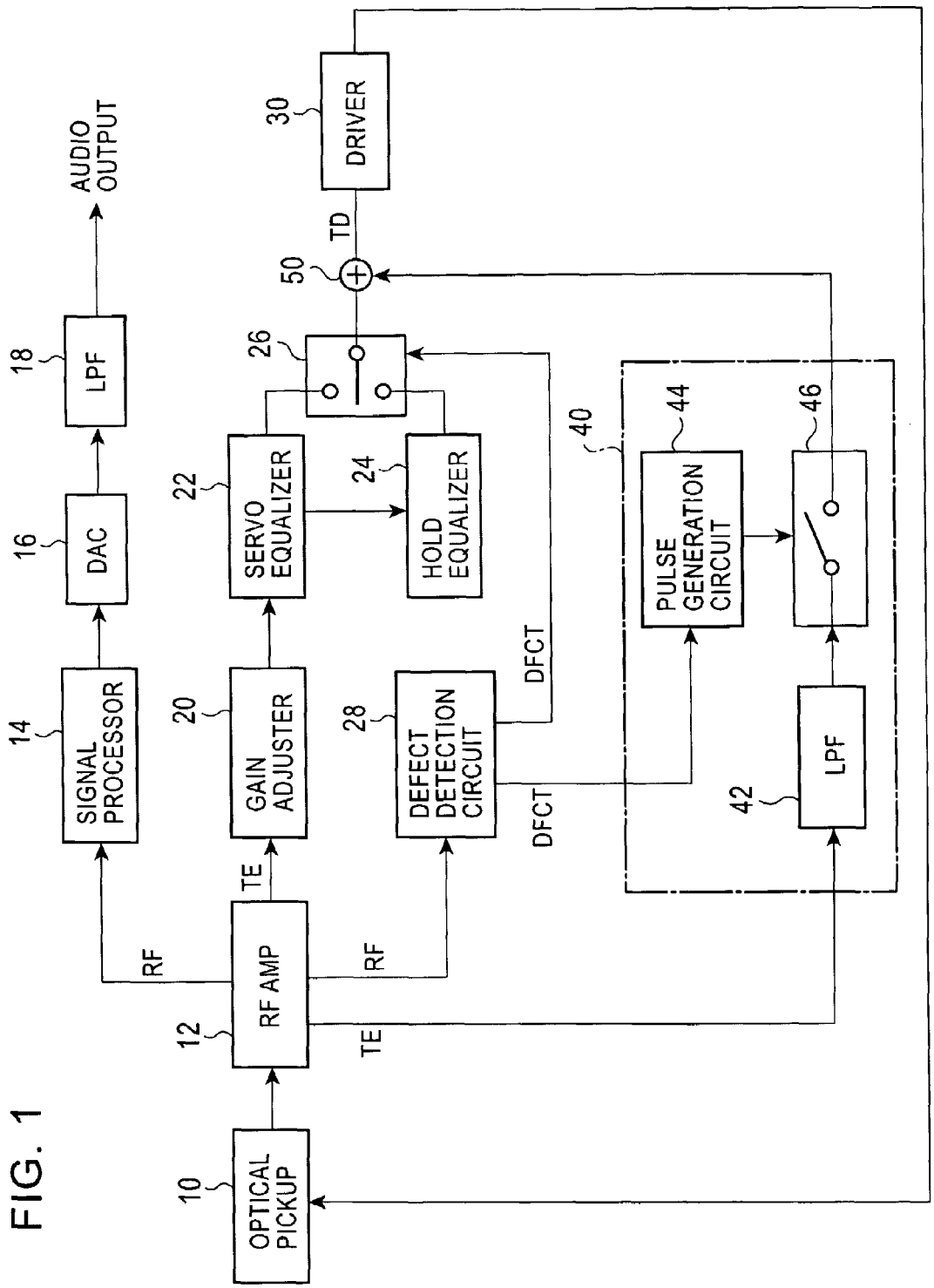
FIG. 1 is a block diagram of an optical disc playback apparatus according to a first embodiment.
Figure 7:
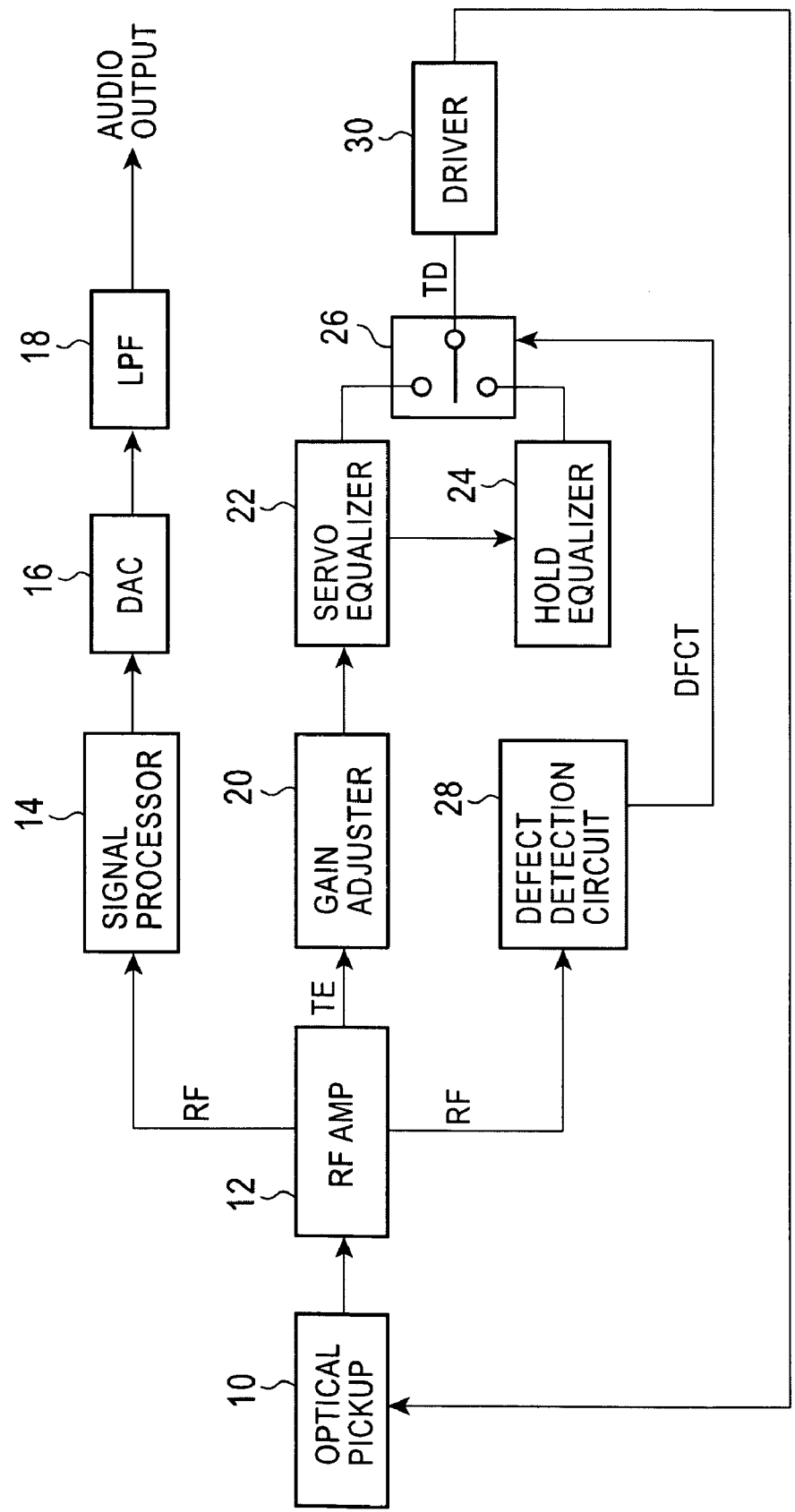
FIG. 7 is a block diagram of a prior art optical disc playback apparatus.
Figure 8:
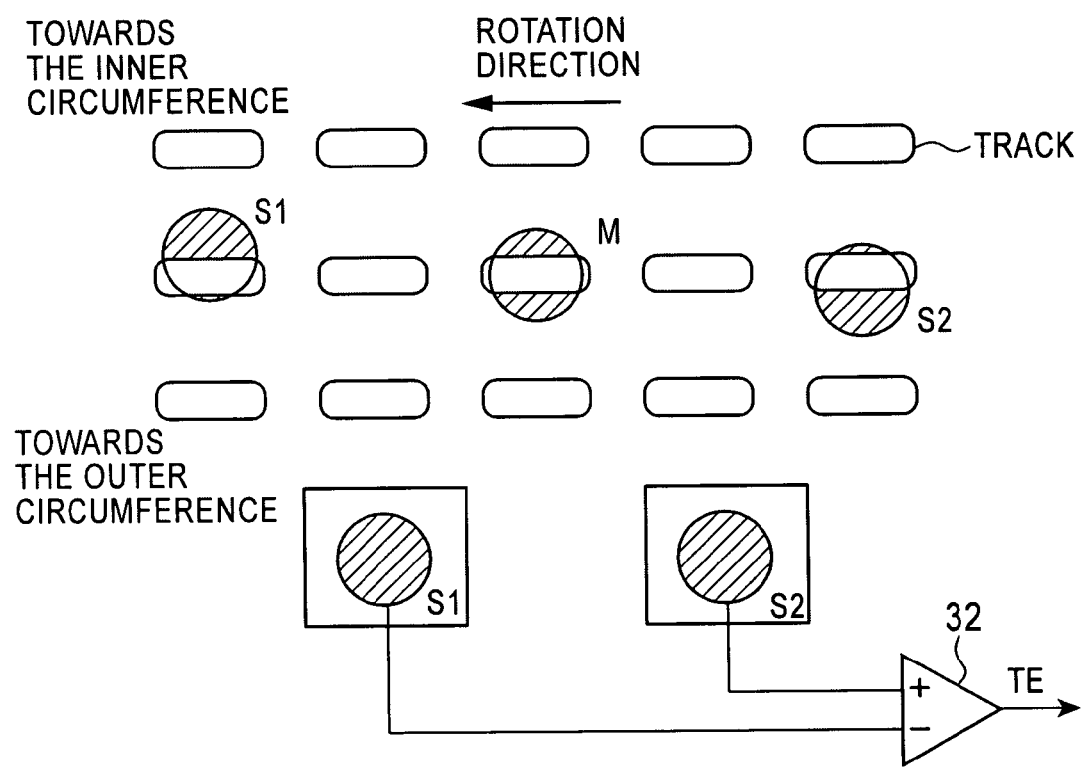
FIG. 8 is a diagram showing a prior art signal detection system of an optical pickup of the optical disc playback apparatus.
Figure 9B:
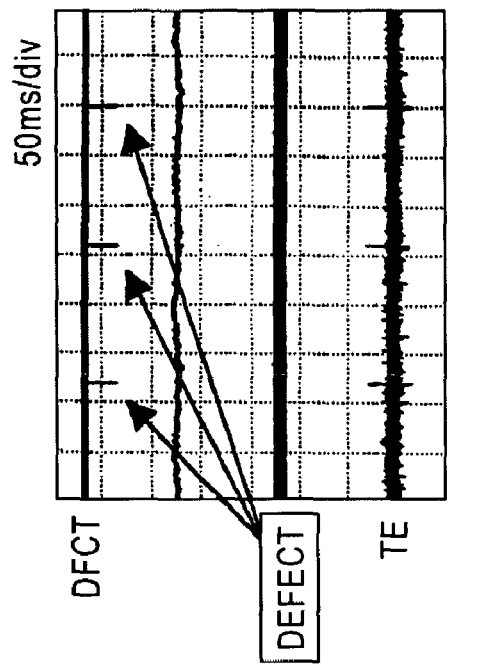
FIGS. 9A and 9B are signal waveforms for describing the operation of a defect detection circuit.
Figure 9A:
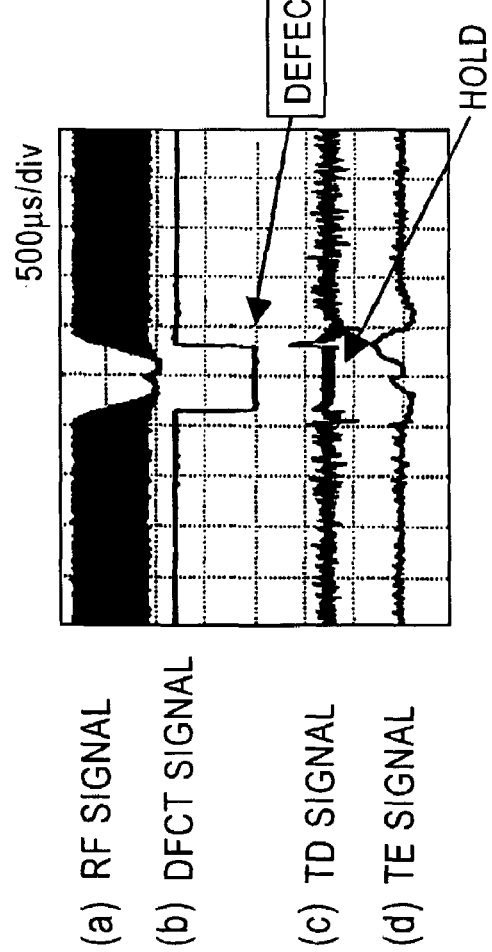
Figure 10C:
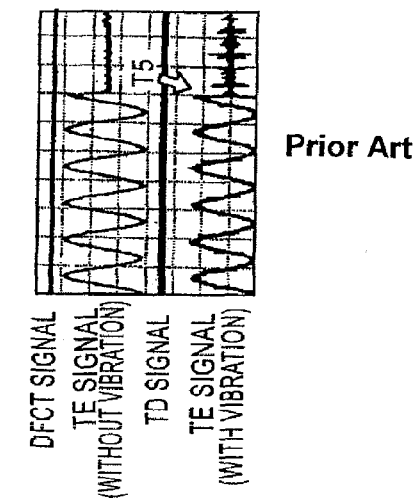
FIGS. 10A to 10C are signal waveforms when playing back a defective disc in a vibration environment.
Figure 10B:
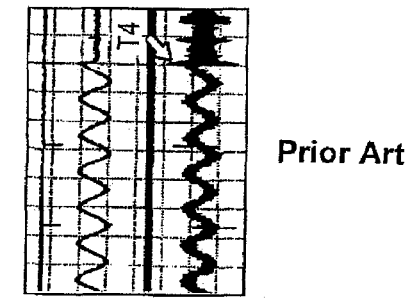
Figure 10A:
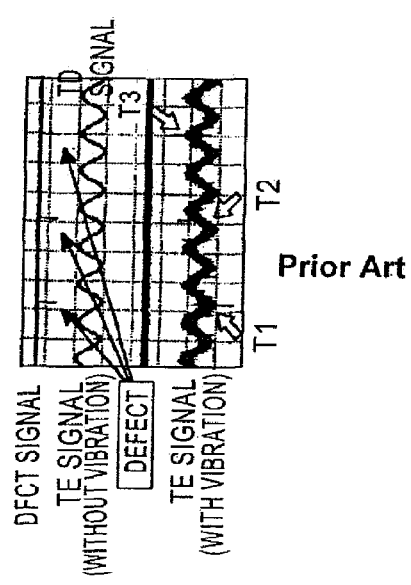

FIG. 1 is a block diagram of an optical disc playback apparatus according to a first embodiment. The same parts as those of the optical disc playback apparatus shown in FIG. 7 are given the same reference numerals. As shown in FIG. 1, the optical disc playback apparatus includes an optical pickup 10 and an RF amplifier 12. The optical pickup 10 irradiates a recording surface of an optical disc with laser light, and converts the reflected light into an electrical signal. The RF amplifier 12 receives the electrical signal from the optical pickup 10, and generates an RF playback signal, a tracking error signal (TE signal), etc. The signal output from the RF amplifier 12 is audibly output via a signal processor 14, a digital-to-analog converter (DAC) 16, and a low-pass filter (LPF) 18, and is converted into an audible sound by a speaker.

In order to perform tracking servo on the optical pickup 10, the TE signal from the RF amplifier 12 is supplied as a tracking driving signal (TD signal) to a driver 30 via a gain adjuster 20, a servo equalizer 22, and a switch 26. The driver 30 controls an actuator of the optical pickup 10 based on the TD signal so that a lens of the optical pickup 10 can be focused on a target track.

A defect detection circuit 28 detects any defects, including scratches, dust, black spots, and stains, on the recording surface of the optical disc, and outputs a DFCT signal indicating the detected defect. If a defect is detected, the TE signal exhibits a turbulent waveform. In this case, the signal output from the servo equalizer 22 is not supplied to the driver 30, and, instead, a hold signal that holds the output signal of the servo equalizer before the defect is detected is supplied to the driver 30 by the switch 26.

When the optical disc playback apparatus is used in a vibration environment, e.g., in a vehicle, tracking servo can be out of control due to vibration if an optical disc has a defect. In order to overcome this problem, this embodiment provides a defect active correction circuit (hereinafter referred to as a corrector) 40 that extracts an oscillation component of the optical pickup 10 when a defect is detected and that outputs the extracted oscillation component as a correction signal, and an adder circuit 50 that adds the correction signal from the corrector 40 to the TD signal.

The corrector 40 includes a low-pass filter (LPF) 42, a pulse generation circuit 44, and a switch 46. The LPF 42 receives the TE signal from the RF amplifier 12, and extracts an oscillation component with respect to the target track position of the optical pickup 10. The pulse generation circuit 44 receives the DFCT signal from the defect detection circuit 28, and outputs a pulse signal having a certain pulse width in response to the DFCT signal. The switch 46 supplies the signal of the LPF 42 for a period of time corresponding to the pulse width in response to the pulse signal.

Due to its structural characteristic, the optical pickup 10 does not oscillate at an oscillation frequency higher than a certain frequency. In this embodiment, the cutoff frequency of the LPF 42 is set to about 200 Hz, and the oscillation component at the frequency higher than 200 Hz is removed. Thus, the LPF 42 extracts the oscillation component of the optical pickup 10 (i.e., the amount of deviation from the target track position) from the TE signal.

The pulse generator circuit 44 may include a one-shot multivibrator, and outputs a pulse signal Pc having a certain pulse width. The pulse signal Pc defines the period of time during which the lens position of the optical pickup 10 is corrected for when a defect is detected or when tracking hold is carried out. The switch 46 outputs the oscillation component from the LPF 42 as a correction signal for the period of time corresponding to the pulse width of the pulse signal Pc of the pulse generator circuit 44.

Figure 2:
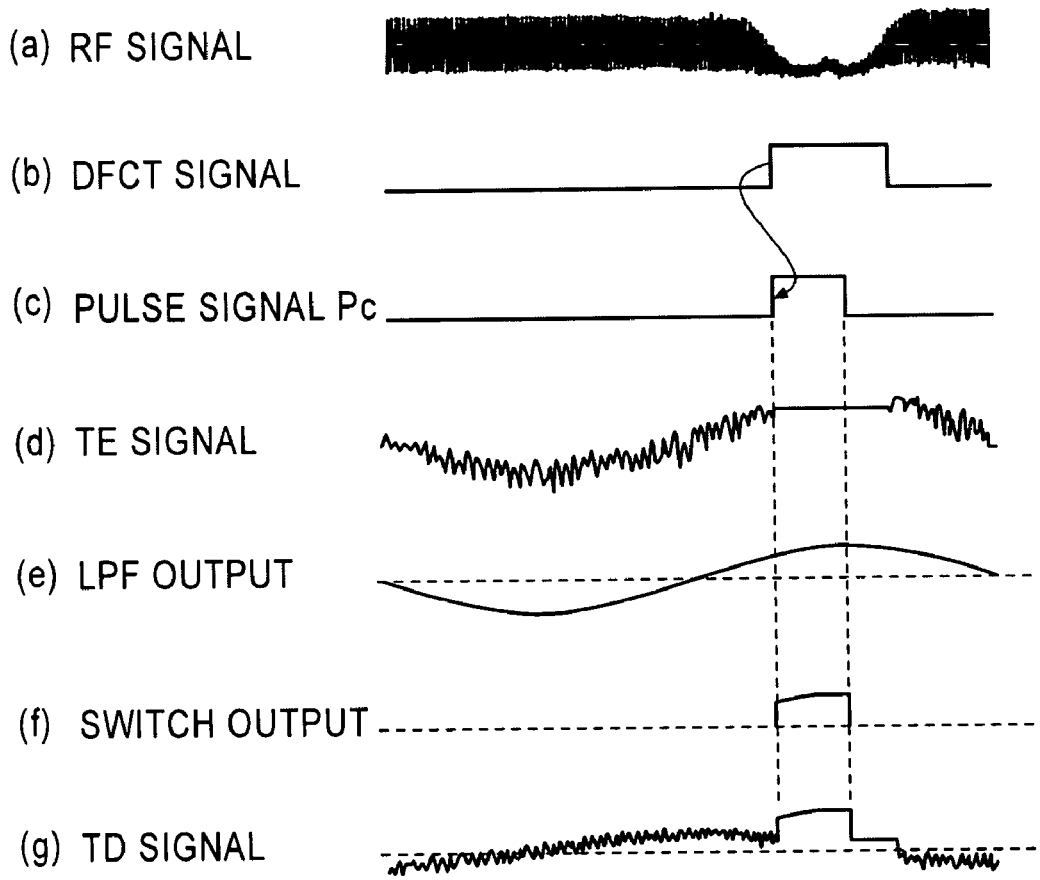
FIG. 2 is a signal waveform for describing the operation of the optical disc playback apparatus of the first embodiment.

The operation of an optical disc playback apparatus according to an embodiment is now described with reference to FIG. 2. In FIG. 2, as indicated by (a), an RF signal drops when any defects including scratches on a disc are read. The defect detection circuit 28 detects this drop, and outputs a DFCT signal having the pulse width corresponding to the signal drop, as indicated by (b). The pulse generation circuit 44 outputs a pulse signal Pc having a certain pulse width in response to the DFCT signal, as indicated by (c).

The switch 26 receives the DFCT signal, and outputs the hold signal from the hold equalizer 24, instead of the servo driving signal from the servo equalizer 22, for the period of time corresponding to the defect, i.e., the pulse width of the DFCT signal.

The LPF 42 removes the high-frequency component of the optical pickup 10 from the TE signal of the RF amplifier 12, and extracts the low-frequency component including the oscillation component, as indicated by (e). As indicated by (f), the switch 46 outputs the signal of the LPF 42 for the pulse period in response to the pulse period of the pulse signal Pc. The adder circuit 50 adds the correction signal output from the switch 46 and the hold signal output from the switch 26, and outputs a TD signal, as indicated by (g). The TD signal is amplified by an actuator amplifier of the driver 30, and controls the operation of the actuator of the optical pickup 10.

FIGS. 3A, 3B, and 3C are waveforms of the TE signal without the corrector 40, and FIGS. 3D, 3E, and 3F are waveforms of the TE signal with the corrector 40. In FIGS. 3A to 3F, the waveform depicted at the lower portion is the magnification of the waveform depicted at the upper portion.

In FIGS. 3A and 3D, a defect is read when the TE signal output from the LPF 42 is at the most positive/plus point. Without a corrector, as shown in FIG. 3A, the amplitude of the TE signal largely varies immediately before the pulse of the DFCT signal rises. With a corrector, as shown in FIG. 3D, correction corresponding to the amount of deviation of the optical pickup 10 to the plus side (towards the outer circumference) is performed, i.e., a positive pulse of a corrected DFCT signal is applied, at the fall time of the pulse of the DFCT signal, in other words, at the hold start time for the defect. Thus, the optical pickup 10 is corrected so as to be focused on the target track, and the amplitude of the TE signal is therefore controlled. In FIGS. 3A and 3D, the polarity of the DFCT signal is opposite to that shown in FIG. 2.

In FIGS. 3C and 3F, a defect is read when the TE signal output from the LPF 42 is at the most negative/minus point. Also, a negative pulse corresponding to the amount of deviation of the optical pickup 10 to the minus side (towards the inner circumference) is applied to correct the optical pickup 10 so as to be focused on the target track. Therefore, the amplitude of the TE signal is controlled.

In FIGS. 3B and 3E, a defect is read when the TE signal output from the LPF 42 is substantially at the middle point. In this case, the optical pickup 10 is positioned substantially on the target track, and therefore is not substantially corrected by the corrector 40.

The amplitude levels of the pulse signal applied by the corrector 40 depend upon the output signal of the LPF 42, in other words, the oscillation or fluctuation component of the optical pickup 10. This allows the optical pickup 10 to promptly follow the target track in tracking servo after a defect has been detected, thus preventing malfunction of servo control.

Figure 4A:
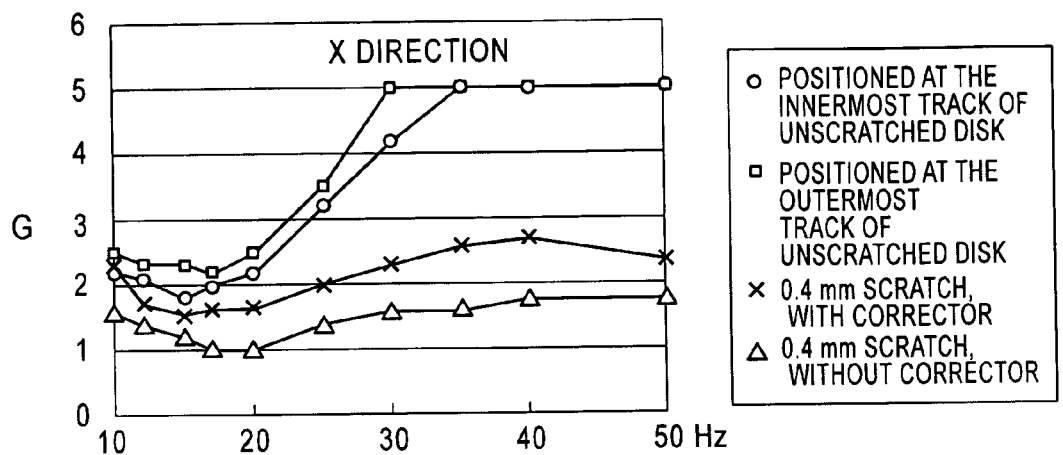
FIGS. 4A to 4C are graphs showing advantages of the optical disc playback apparatus of the first embodiment.
Figure 4B:
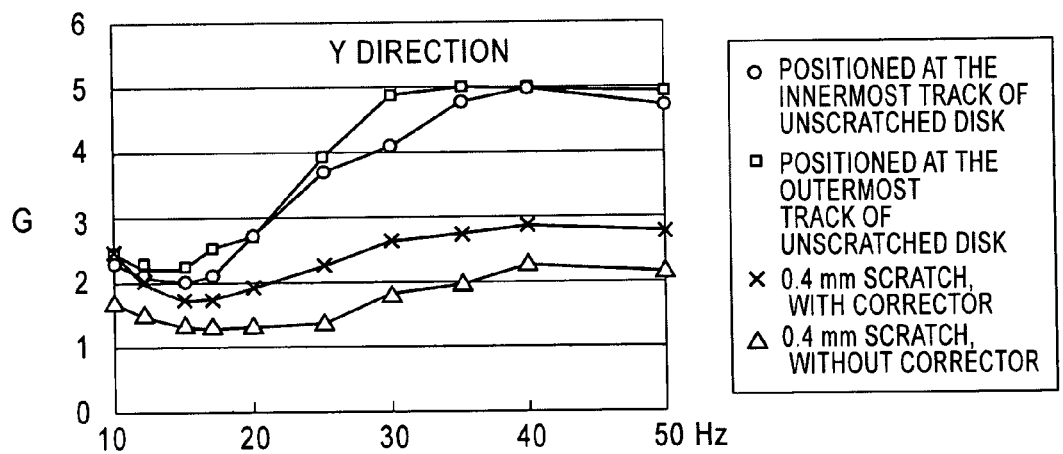
Figure 4C:
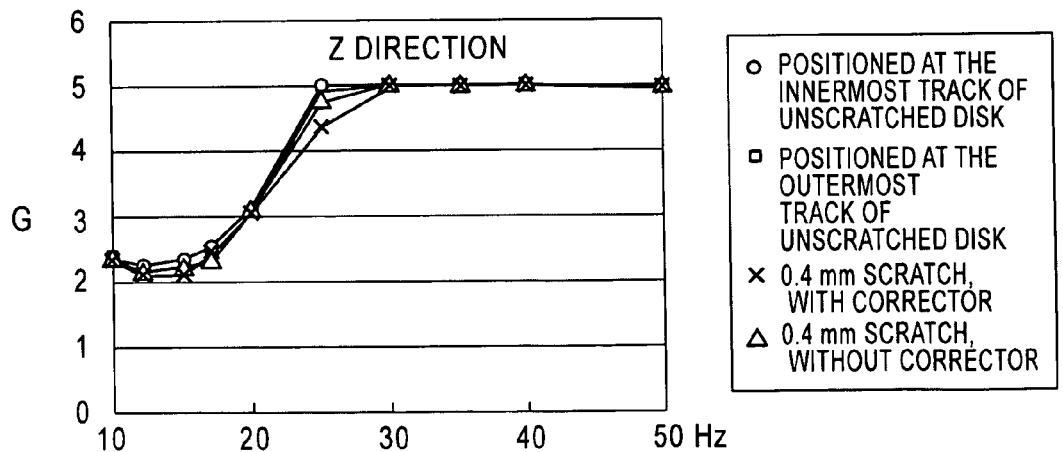

FIGS. 4A to 4C are graphs showing how the optical pickup 10 follows the track when the optical disc playback apparatus is vibrating. In the graphs shown in FIGS. 4A to 4C, the x axis denotes the oscillation frequency (Hz), and the y axis denotes the acceleration (G). The line graphs shown in FIGS. 4A to 4C show the relationship between the oscillation frequency and the acceleration immediately before the optical pickup 10 jumps from the target track. In FIGS. 4A, 4B, and 4C, the optical disc playback apparatus is vibrated in the X-, Y-, and Z-directions, respectively.

In the graphs shown in FIGS. 4A, 4B, and 4C, circles indicate that the optical pickup 10 is positioned at the innermost track of an unscratched optical disc, squares indicate that the optical pickup 10 is positioned at the outermost track of an unscratched optical disc, crosses indicate that an optical disc having a 0.4-mm scratch is played back with the corrector 40, and triangles indicate that an optical disc having a 0.4-mm scratch is played back without the corrector 40.

As is apparent from the graphs shown in FIGS. 4A and 4B, the acceleration with the corrector 40, which causes track jumping (or causes the servo to become out of control), is larger in the X- and Y-directions than that without the corrector 40. Thus, the optical disc playback apparatus still has high tracking ability even when strongly vibrated. The Z-direction vibration is vertical to the tracking direction, and the corrector 40 is less effective.

Figure 5:
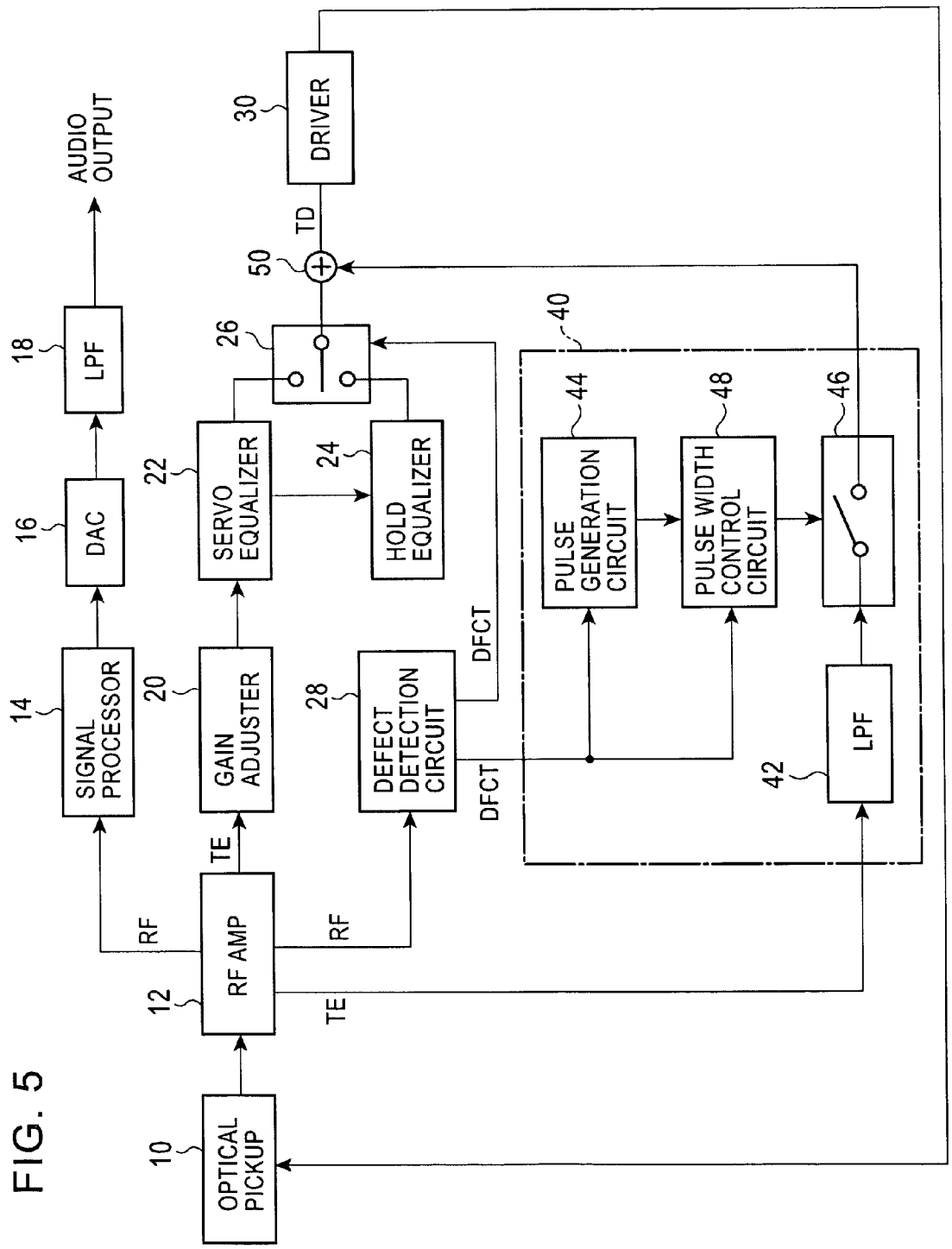
FIG. 5 is a block diagram of an optical disc playback apparatus according to a second embodiment.

An optical disc playback apparatus according to a second embodiment is now described. FIG. 5 is a block diagram of the optical disc playback apparatus according to the second embodiment. The same parts as those in the first embodiment are given the same reference numerals, and a description thereof is omitted.

In the second embodiment, the corrector 40 further includes a pulse width control circuit 48 for varying the width of the pulse signal output from the pulse generation circuit 44. The pulse width control circuit 48 includes an AND circuit that carries out the logical AND between a pulse signal Pc from the pulse generation circuit 44 and a DFCT signal, and controls the pulse width corresponding to the size of a defect on an optical disc.

Figure 6A:
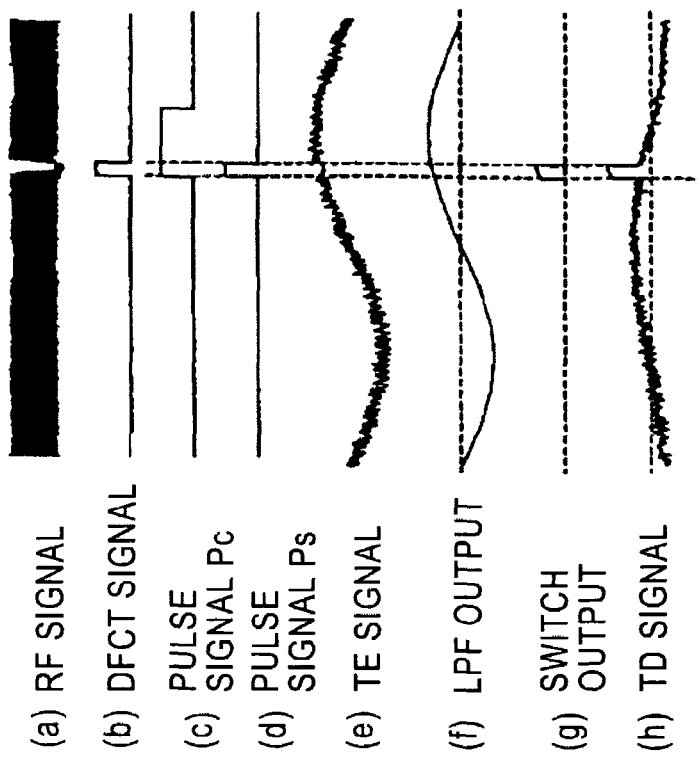
FIGS. 6A and 6B are signal waveforms for describing the operation of the optical disc playback apparatus of the second embodiment.
Figure 6B:
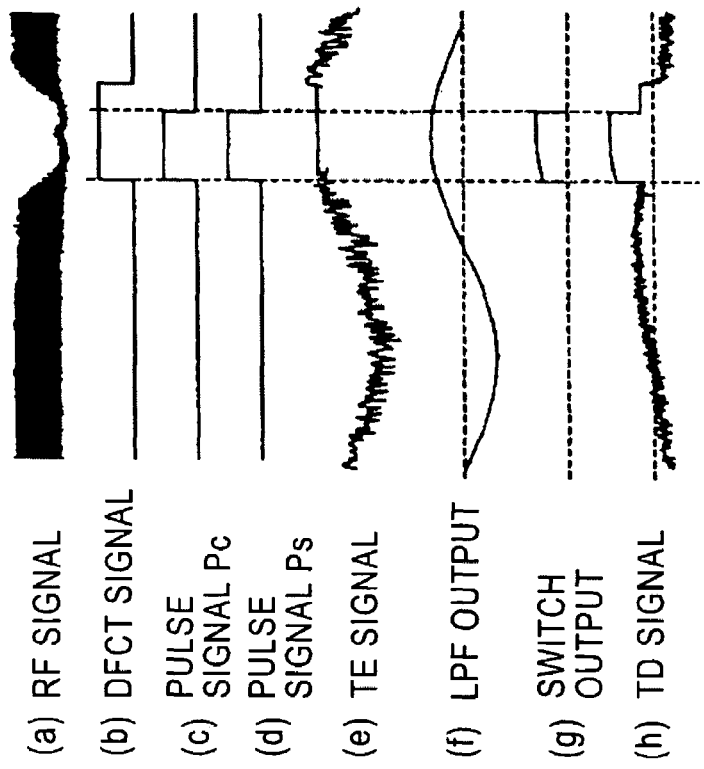

FIGS. 6A and 6B are waveforms showing that a disc having a large scratch width and a disc having a small scratch width are played back by the optical disc playback apparatus of the second embodiment, respectively.

The larger the scratch width, the longer the period of time during which the RF signal falls, as indicated by (a). Thus, as indicated by (b), the pulse width of the DFCT signal becomes longer. The pulse generation circuit 44 outputs a pulse signal Pc having a constant pulse width, as indicated by (c). The pulse width control circuit 48 outputs a pulse signal Ps that is obtained by carrying out the logical AND between the pulse signal Pc and the DFCT signal, as indicated by (d). Thus, the pulse width of the pulse signal Ps is long for a scratch having a large width, and the pulse width of the pulse signal Ps is short for a scratch having a small width. The switch 46 outputs the output signal of the LPF 42 as a correction signal to the adder circuit 50 for the period of time corresponding to the pulse width of the pulse signal Ps. Thus, the TD signal is corrected for a period of time in accordance with the scratch width.

Correction for a longer period than necessary for a disc having a smaller width defect, such as a scratch, a black spot, or a stain, can cause audio skipping. In the second embodiment, the pulse width of the pulse signal Ps is variable according to the size of the defect, and correction is performed for the period of time corresponding to the defect. This results in proper correction of the TD signal, and prevents the occurrence of audio skipping, etc.

An optical disc playback apparatus is broadly applicable to on-vehicle audio devices, household audio devices, electronic devices, such as personal computers, navigation systems, etc.

While the preferred embodiments of the present invention have been described in detail, the present invention is not limited to these illustrated embodiments. A variety of modification and changes can be made without departing from the scope of the present invention set forth in the appended claims.

What is claimed is:

1. An optical disc playback apparatus, the apparatus comprising:
   a) an optical pickup, the optical pickup operable to irradiate a recording surface of an optical disc with light and to output an electrical signal in response to light reflected from the recording surface;
   b) an error signal generating circuit operable to generate a tracking error signal indicating an error of the optical pickup with respect to the recording surface on the basis of the electrical signal from the optical pickup;
   c) a defect detecting circuit operable to detect a defect on the recording surface of the optical disc based on the electrical signal and to output a defect detection signal indicating the detected defect;
   d) a switch circuit operable to output a servo driving signal based on the tracking error signal when no defect is detected and to output a hold signal when a defect is detected, wherein the hold signal is the servo driving signal output prior to detecting the defect on the recording surface of the optical disc;
   e) a driving control circuit operable to control the optical pickup based on a signal output from the switch circuit;
   f) a correcting circuit operable to extract an oscillation component of the error signal when a defect is detected based on the defect detection signal and output a correction signal, the correcting circuit comprising:
      1) an extracting circuit operable to extract a low-frequency signal from the tracking error signal, wherein the low-frequency signal is the oscillation component of the tracking error signal of the optical pickup;
      2) a pulse generating circuit operable to generate a pulse signal having a constant pulse width, wherein the constant pulse width is based on a pulse width of the defect detection signal; and
      3) an output circuit operable to output the low-frequency signal extracted by the extracting circuit as the correction signal for a period corresponding to the constant pulse width of the pulse signal; and
   g) an adding circuit operable to add the correction signal and the hold signal, and output the sum thereof to the driving circuit as a signal TD for a period corresponding to the constant pulse width of the pulse signal.

2. The apparatus of claim 1, wherein the correcting circuit further comprises a pulse width control circuit operable to vary the constant pulse width of the pulse signal generated from the pulse generating circuit based on the defect detection signal.

3. The apparatus of claim 2, wherein the pulse width control circuit generates a pulse signal having a pulse width proportional to the size of a detected defect.

4. The apparatus of claim 1, wherein the extracting circuit comprises a low-pass filter operable to extract a signal indicating a deviation of the optical pickup caused by vibration from a target track based on the tracking error signal.

5. The apparatus of claim 1, wherein the correction signal comprises the extracted oscillation component of the error signal.

6. An optical disc playback method comprising the acts of:
   a) irradiating a recording surface of an optical disc with light; outputting an electrical signal based on the light reflected by the recording surface;
   b) generating a tracking error signal indicting an error of the optical pickup with respect to the recording surface based on the electrical signal;
   c) outputting a defect detection signal indicating a defect that is detected on the recording surface of the optical disc based on the electrical signal;
   d) outputting, based on the defect detection signal, a servo driving signal based on the tracking error signal when no defect is detected and a hold signal when a defect is detected, wherein the hold signal is the servo driving signal output prior to detecting the defect on the recording surface of the optical disc;
   e) outputting a correction signal comprising a low-frequency oscillation component for a period corresponding to a constant pulse width of a pulse signal, the oscillation component being extracted from the error signal when a defect is detected based on the defect detection signal; and
   f) adding the correction signal to the hold signal and outputting the sum thereof as a driving signal TD for a period corresponding to the constant pulse width of the pulse signal,
   wherein the act of outputting the correction signal comprises:
      1) applying a low-pass filter to extract a low-frequency signal indicating an oscillation component of the optical pickup from the tracking error signal;
      2) generating the pulse signal having the constant pulse width based on a pulse width of the defect detection signal; and
      3) outputting at least a portion of the low-frequency signal as the correction signal in a period corresponding to the constant pulse width of the pulse signal.

7. The method of claim 6, wherein the act of generating a pulse signal comprises generating a pulse signal having a pulse width corresponding to the size of the defect.

8. The method of claim 6, wherein the act of generating a pulse signal further comprises varying the constant pulse width of the pulse signal based on the defect detection signal.

9. The apparatus of claim 1, wherein the pulse signal generated by the pulse generating circuit has a constant amplitude.

10. The method of claim 6, wherein the pulse signal has a constant amplitude.

* * * * *

UNITED STATES PATENT AND TRADEMARK OFFICE
CERTIFICATE OF CORRECTION

| | |
|---|---|
| PATENT NO. | : 7,551,528 B2 |
| APPLICATION NO. | : 11/041190 |
| DATED | : June 23, 2009 |
| INVENTOR(S) | : Shinichi Nirei |

It is certified that error appears in the above-identified patent and that said Letters Patent is hereby corrected as shown below:

In column 8, claim 6, line 22, after "tracking error signal" replace "indicting" with --indicating--.

Signed and Sealed this

Twenty-seventh Day of October, 2009

David J. Kappos
*Director of the United States Patent and Trademark Office*